(12) United States Patent
Morrish

(10) Patent No.: US 7,978,455 B2
(45) Date of Patent: Jul. 12, 2011

(54) ADAPTIVE TRANSIENT BLOCKING UNIT

(75) Inventor: Andrew J. Morrish, Saratoga, CA (US)

(73) Assignee: Bourns, Inc., Riverside, CA (US)

( * ) Notice: Subject to any disclaimer, the term of this patent is extended or adjusted under 35 U.S.C. 154(b) by 1007 days.

(21) Appl. No.: 11/891,145

(22) Filed: Aug. 8, 2007

(65) Prior Publication Data
US 2008/0037193 A1    Feb. 14, 2008

Related U.S. Application Data

(60) Provisional application No. 60/837,226, filed on Aug. 10, 2006.

(51) Int. Cl.
*H02H 1/04* (2006.01)
(52) U.S. Cl. ........................................ 361/119
(58) Field of Classification Search .................. 361/119
See application file for complete search history.

(56) References Cited

U.S. PATENT DOCUMENTS

| | | | | |
|---|---|---|---|---|
| 4,744,369 A | * | 5/1988 | Kroll ............................... | 600/509 |
| 2006/0285264 A1 | * | 12/2006 | Harris .............................. | 361/58 |
| 2007/0035906 A1 | * | 2/2007 | Harris et al. ................... | 361/118 |

* cited by examiner

*Primary Examiner* — Jared J Fureman
*Assistant Examiner* — Nicholas Ieva
(74) *Attorney, Agent, or Firm* — Lumen Patent Firm

(57) ABSTRACT

A variable trip limit transient blocking unit (TBU) is provided. The variable trip limit transient blocking unit circuit includes a transient blocking unit and a low-pass filter, such as an RC circuit having an RC time constant. The RC circuit is disposed to approximate an integrator operating over periods of time that are short compared to the RC time constant. The RC circuit integrates a signal representing an approximated current flowing through the transient blocking unit and triggers a disconnect threshold in the transient blocking unit when a voltage stored across a capacitor of the RC circuit reaches a predefined limit.

10 Claims, 7 Drawing Sheets monitoring a transient current duration and a transient current amplitude of the transient blocking unit decreasing the variable disconnect threshold when the current duration exceeds a predetermined time value or when the current amplitude exceeds a predetermined current value, whereby the duration limit is defined by a capacitor value triggering the disconnect of the transient blocking unit

*FIG. 11*

ADAPTIVE TRANSIENT BLOCKING UNIT

CROSS-REFERENCE TO RELATED APPLICATIONS

This application is cross-referenced to and claims the benefit from U.S. Provisional Patent Application 60/837,226 filed Aug. 10, 2006, which is hereby incorporated by reference.

FIELD OF THE INVENTION

The invention relates generally to electronic circuits. More particularly, the invention relates to transient blocking units having variable trigger limits for protecting following devices and circuits.

BACKGROUND

Conventional transient blocking units (TBUs) typically have a fixed voltage threshold or a fixed current threshold, which if exceeded, will cause the TBU to "trip" and switch into a substantially non-conducting state, thereby protecting following devices and circuits from the above-threshold transient.

A TBU may have a current limit that is too low for some applications to prevent nuisance tripping, or may be too high to allow sufficient thermal dissipation. A TBU has to be able to pass the normal operation peak currents without tripping, but must still effectively trip when sustained or very high peak currents occur. Such conventional TBU operation can be problematic in applications where large (but not damaging) transients can occur in normal operation. For example, transients can occur as the telephone receiver is lifted off the hook, the so-called "ring trip" condition. Substantial overdesign and/or reduced levels of protection can occur if a conventional TBU is required to accommodate such normal transients without disconnecting.

TBU's using very small die package sizes designed to handle high power without encountering thermal problems can be difficult to accomplish. Further, high-resistance and dual TBU configurations are known to exacerbate the problem of very high transients, where high trip levels can create difficult conditions for TBU dissipation, often requiring additional heat-sinking to the device and consuming valuable package space.

Accordingly, there is a need to develop a TBU that can provide a high current limit to prevent nuisance tripping and further provide a low current limit that will protect following devices and circuits from the above-threshold transient.

SUMMARY OF THE INVENTION

According to the present invention, the TBU disconnect threshold is not a simple fixed current (or voltage) threshold. Instead, the threshold depends on the time-varying TBU current I(t) (and/or the time-varying TBU voltage V(t)). For example, an integrator of TBU current I(t) can be approximately implemented with an RC circuit, and the TBU can be disconnected based on a comparison of the RC circuit voltage with a predetermined threshold value. In this manner, high-current transients of sufficiently short duration can be accommodated by the TBU without triggering a full disconnect.

In one aspect of the invention, a variable trip limit transient blocking unit circuit, also know as an adjustable TBU, includes a transient blocking unit and a low-pass filter, where the filter is an RC circuit having an RC time constant. The RC circuit is disposed to approximate an integrator operating over periods of time that are short compared to the RC time constant. Here, the RC circuit integrates a signal representing an approximated current flowing through the transient blocking unit and triggers a disconnect threshold in the transient blocking unit when a voltage stored across a capacitor of the RC circuit reaches a predefined limit.

In another aspect of the invention, the transient blocking unit includes a PJFET connected to a depletion mode NMOS, where the connection provides a transient blocking unit having high disconnect threshold. The capacitor of the low-pass filter is disposed to receive a charge when a voltage is provided across the transient blocking unit. The capacitor of the low-pass filter is disposed to provide a gate-source voltage to the PJFET, thus creating a sharp threshold point in the PJFET, and creating a rapid increase in a drain-source resistance of the transient blocking unit. The drain-source of the transient blocking unit is disposed to provide feedback to the capacitor, such that the rapid increase in the drain-source resistance provides a high voltage drop across the transient blocking unit, where the feedback increases the voltage across the capacitor to trigger the disconnect threshold of the transient blocking unit.

In another aspect of the invention, the variable trip limit transient blocking unit circuit has a current monitoring circuit, where the current monitoring circuit monitors a transient current duration and a transient current amplitude of the transient blocking unit. The variable trip limit transient blocking unit circuit further includes a variable trip threshold, where the variable trip threshold decreases when the current duration exceeds a predetermined time value or decreases when the current amplitude exceeds a predetermined current value, where the duration limit is defined by a capacitor value. Here, the variable trip threshold is dependent on a parameter selected from a group consisting of current, voltage, temperature and time. In one aspect, the capacitor can be an external capacitor.

In another aspect of the invention, a method of providing a variable trip limit transient blocking unit includes monitoring a transient current duration and a transient current amplitude of the transient blocking unit, decreasing the variable disconnect threshold when the current duration exceeds a predetermined time value or when the current amplitude exceeds a predetermined current value, where the duration limit is defined by a capacitor value, and triggering the disconnect of the transient blocking unit.

BRIEF DESCRIPTION OF THE FIGURES

The objectives and advantages of the present invention will be understood by reading the following detailed description in conjunction with the drawing, in which:

FIG. 11 shows the steps for a method of providing a variable trip limit transient blocking unit.

DETAILED DESCRIPTION OF THE INVENTION

Although the following detailed description contains many specifics for the purposes of illustration, anyone of ordinary skill in the art will readily appreciate that many variations and alterations to the following exemplary details are within the scope of the invention. Accordingly, the following preferred embodiment of the invention is set forth without any loss of generality to, and without imposing limitations upon, the claimed invention.

The variable trip limit transient blocking unit, or adaptive TBU, monitors the duration and amplitude of the current and varies the current limit threshold such that it decrease if either the amplitude or duration of the fault current is greater than is safe for the unit or application. The duration before decreasing the limit is governed by an external capacitor and can be adjusted to suit a given application. According to the current invention, the current limit becomes a function of the current being conducted and the duration of the conduction. In one aspect, the invention has a high initial current trip threshold, allowing for high peak transient currents, such as momentarily seen during the "ring trip" period of a telephone ringing system. Further, after a sustained period of current flow, the trip threshold then drops to a lower level to limit the maximum total dissipation. The period and characteristics of the variable trip threshold can be controlled as a function of time, conducted current, applied voltage, device temperature or any combination thereof. By controlling the device trip threshold, additional parameters may also be used to affect the trip threshold using other control circuits.

Figure 1:
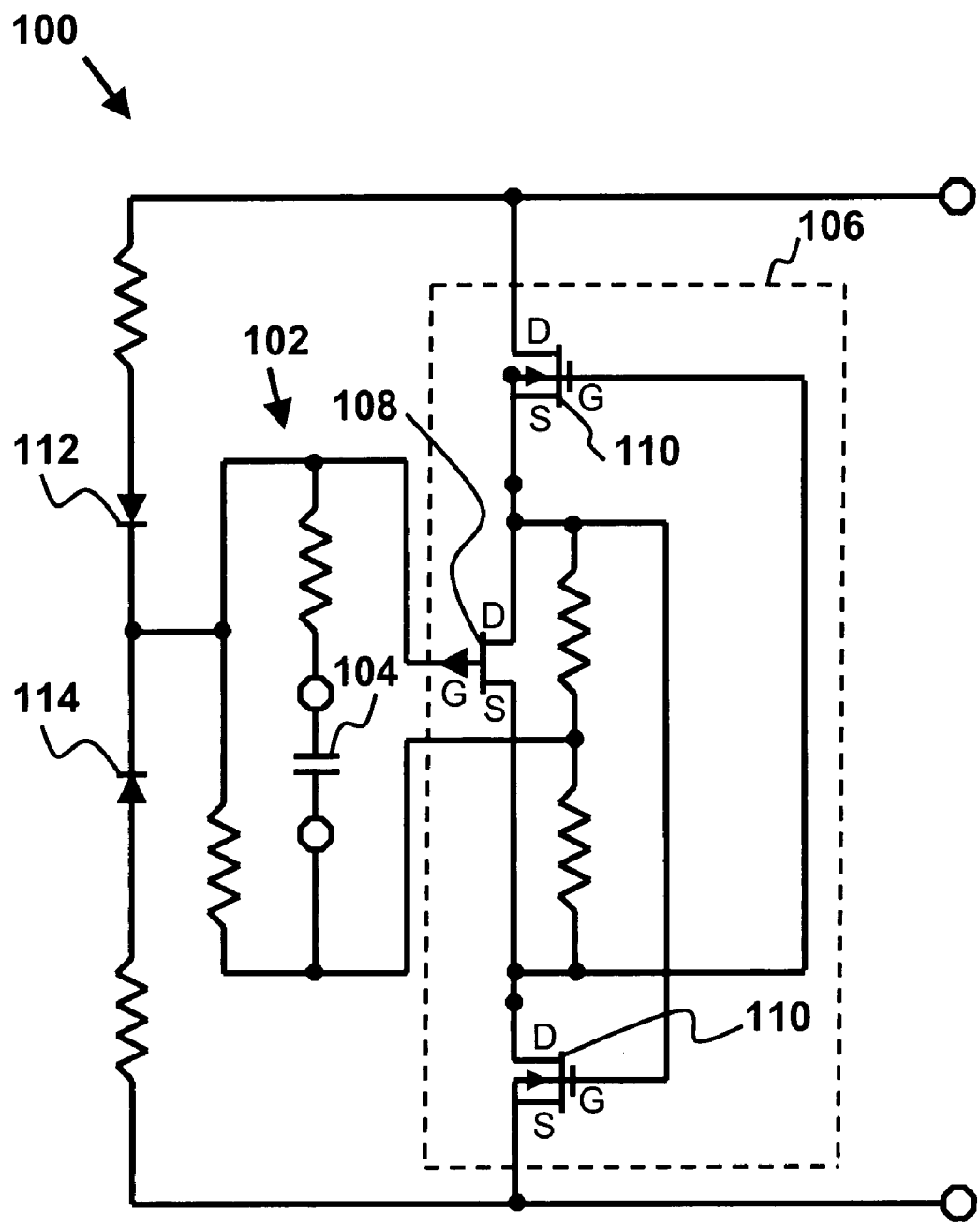
FIG. 1 shows a schematic drawing of an adaptive TBU according to the present invention.

According to one aspect of the invention, a circuit monitors a voltage drop across a TBU (described below). The voltage drop is a sufficient approximation of a constant resistance over a majority of the TBU conductive state. Further, this voltage is a close representation of the current flowing through the device to be protected. FIG. 1 shows a schematic drawing of an adaptive TBU 100 according to the present invention. In one aspect, an RC circuit 102 forms a low-pass filter which acts as an approximation to an integrator over periods of time that are short with respect to the RC time constant. The RC circuit 102 thus integrates the signal representing the TBU current, and when the voltage stored across the capacitor 104 of the RC circuit reaches a predefined threshold, the TBU 106 is triggered. Accordingly, the trip current is both a function of the magnitude of the current, and the duration the current is being conducted.

A PJFET 108 and a depletion-mode NMOS 110 are connected to form a TBU 106 having a relatively high current limit, such as a current limit that is twice a normal trip limit, for example 250 mA. In this embodiment, the current flows through the device to be protected (not shown), where the voltage developed across the TBU 106 charges the capacitor 108 of the RC circuit 102. As the voltage across the capacitor 108 increases, a gate-source voltage (G) of the PJFET 108 reaches a relatively sharp threshold point to create a rapid increase in a drain-source resistance (D, S) of the PJFET 108. The sudden change in resistance results in a substantially higher voltage drop across the TBU 106, which provides further positive feedback to the increasing voltage across the capacitor 104, resulting in an abrupt turn-off.

According to the current invention, the junction breakdown voltage of the PJFET 108 limits the maximum voltage seen across diodes (112, 114) and the capacitor 104 of the RC circuit 102 to enable the diodes (112, 114) and capacitor 104 to be low-voltage devices. The capacitor 104 can be an external device. The capacitor 104 can further have a value around 0.1 µF for use in telephony applications.

It should be apparent to one skilled in the art, the low-pass filter 102 can be a switched capacitor filter (not shown) or a digitally-based integration function block (not shown).

Figure 2:
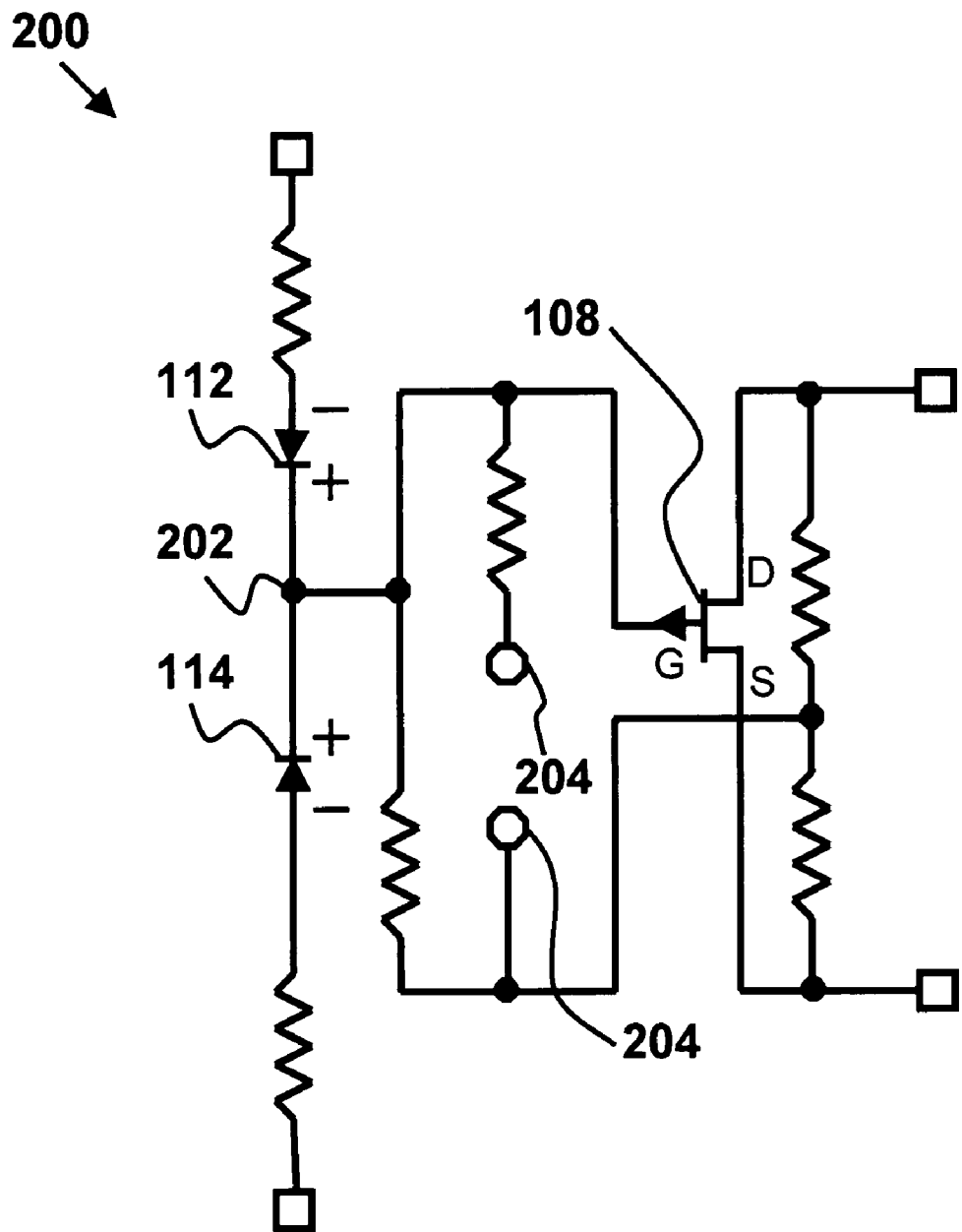
FIG. 2 shows an external-connection embodiment according to the present invention.
Figure 3:
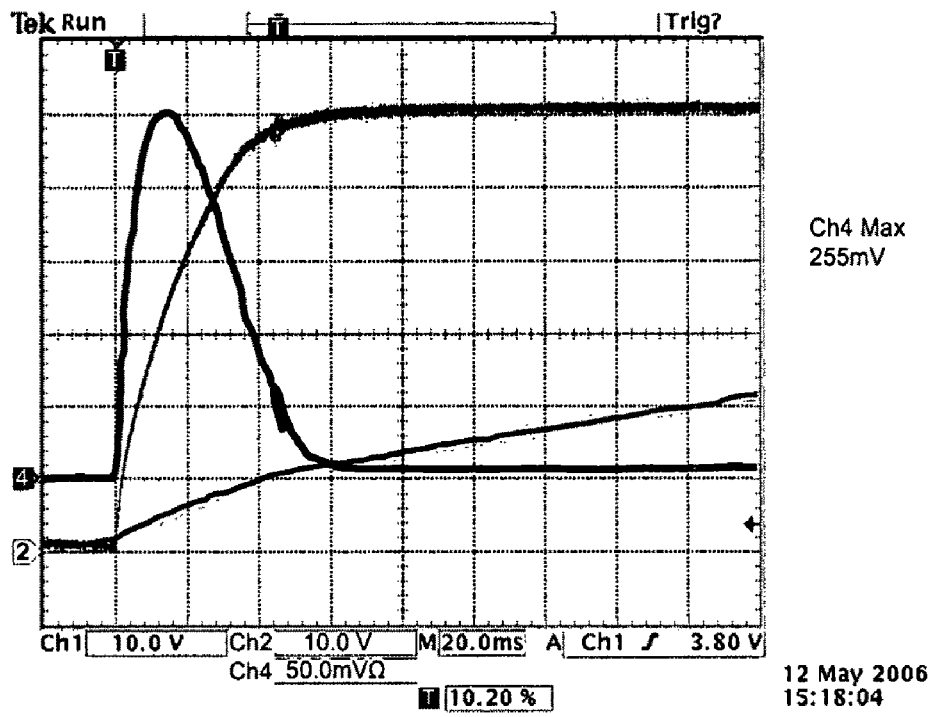
FIGS. 3-6 show test results of a constructed prototype according to the present invention.
Figure 4:
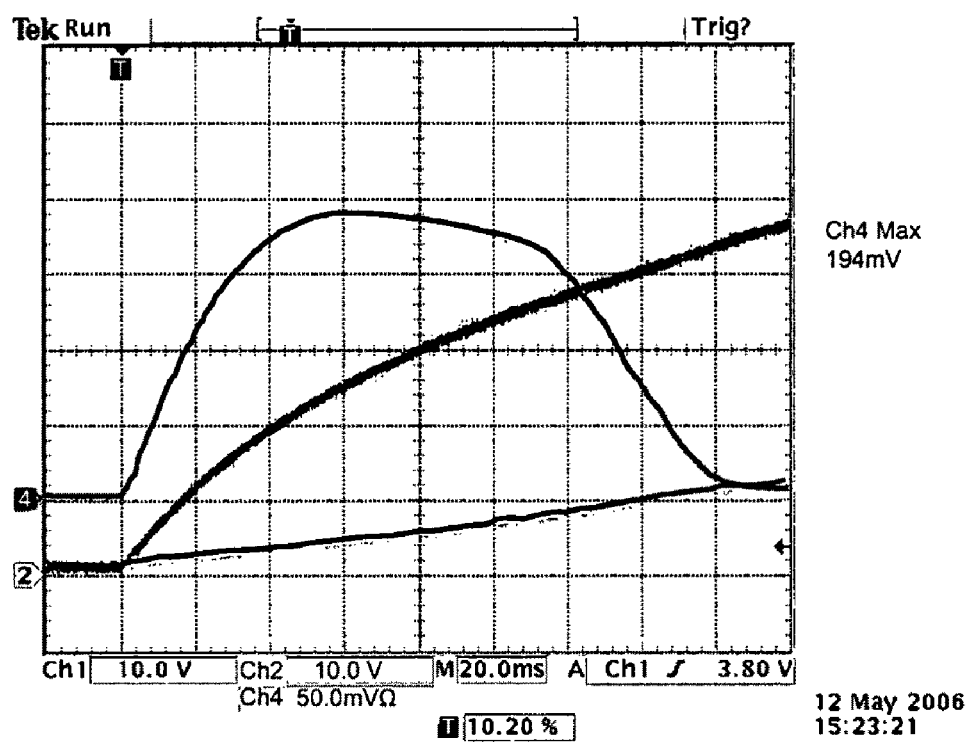
Figure 5:
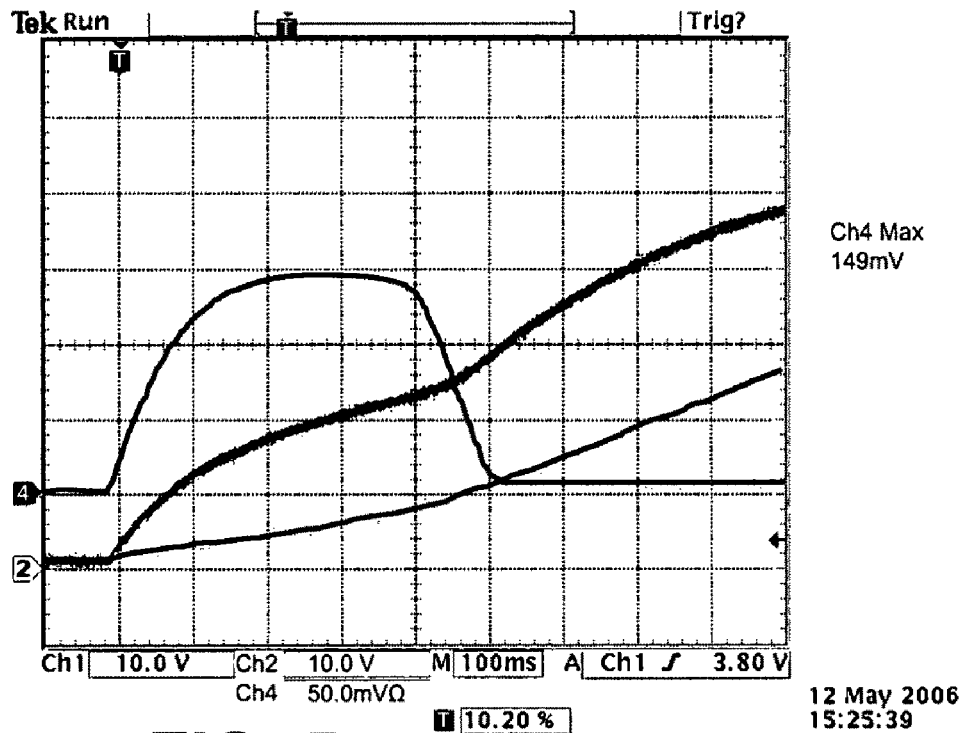
Figure 6:
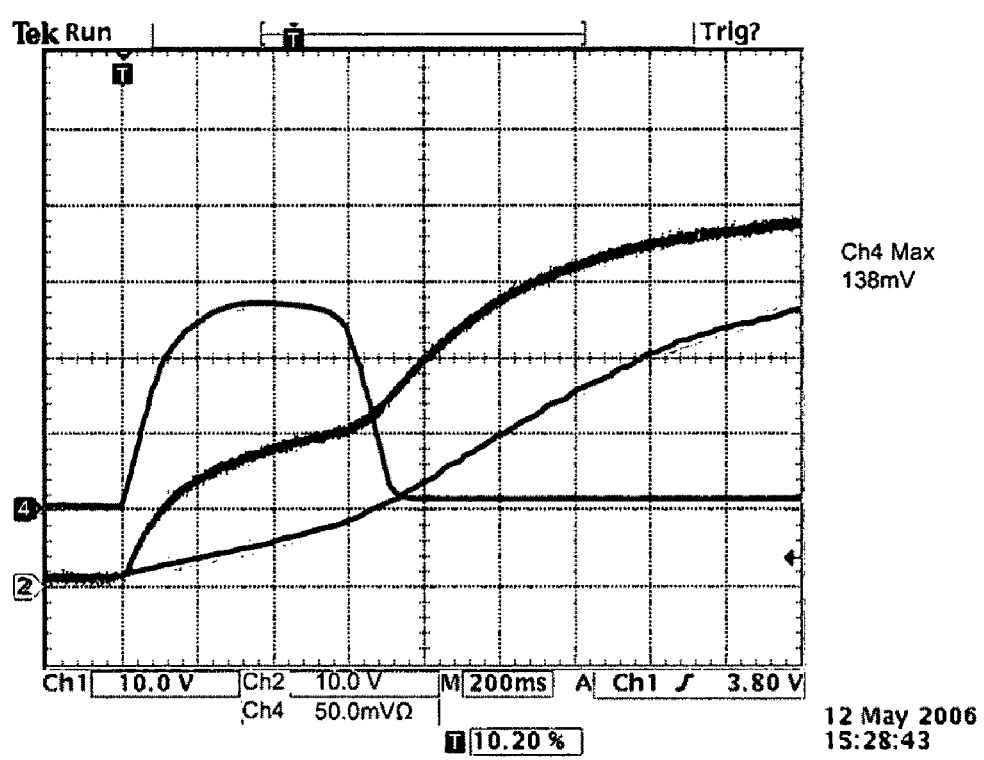

FIG. 2 shows an alternate embodiment of the invention, where shown is an external-connection embodiment 200 that allows for the external connection of the capacitor 104 (not shown) and maintaining the inclusion of the two diodes (112, 114). As the diode cathodes 202 are connected to the gate (G), (the substrate of the JFET) they can use the same processing as the basic PJFET 118 junction, being simply additional P wells in the Epitaxial layer (not shown). The maximum voltage that the diodes (112, 114) ever see is limited by the avalanche voltage of the PJFET 118, so they do not need to be high voltage types.

The circuits described above provide the desired function of an adaptive TBU 100 that can provide a high current limit to prevent nuisance tripping and further provide a low current limit that will protect following devices and circuits from the above-threshold transient.

FIGS. 3-6 show tests of a constructed prototype. Some typical scope traces are shown (note increasing time scale). The figures show the adaptive TBU triggering when subject to various currents over different durations, where the figures are presented according to increasing duration versus decreasing current.

Figure 7:
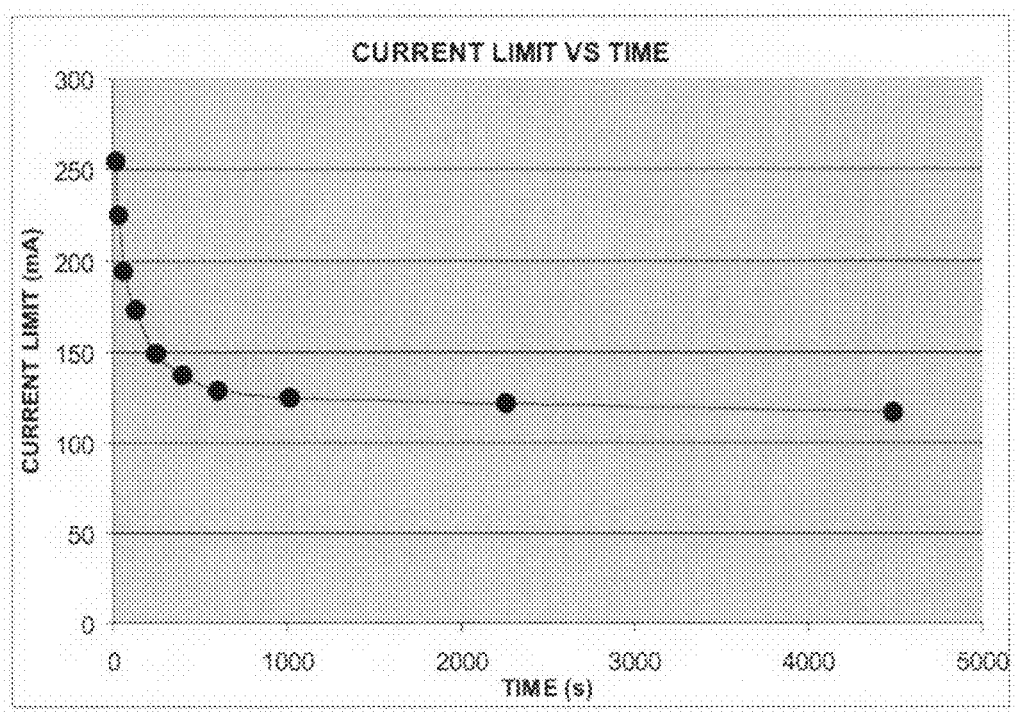
FIG. 7 shows further testing to provide a plot of a current limit versus time according to the present invention.

FIG. 7 shows results from further testing to provide a plot of a current limit versus time.

Figure 8:
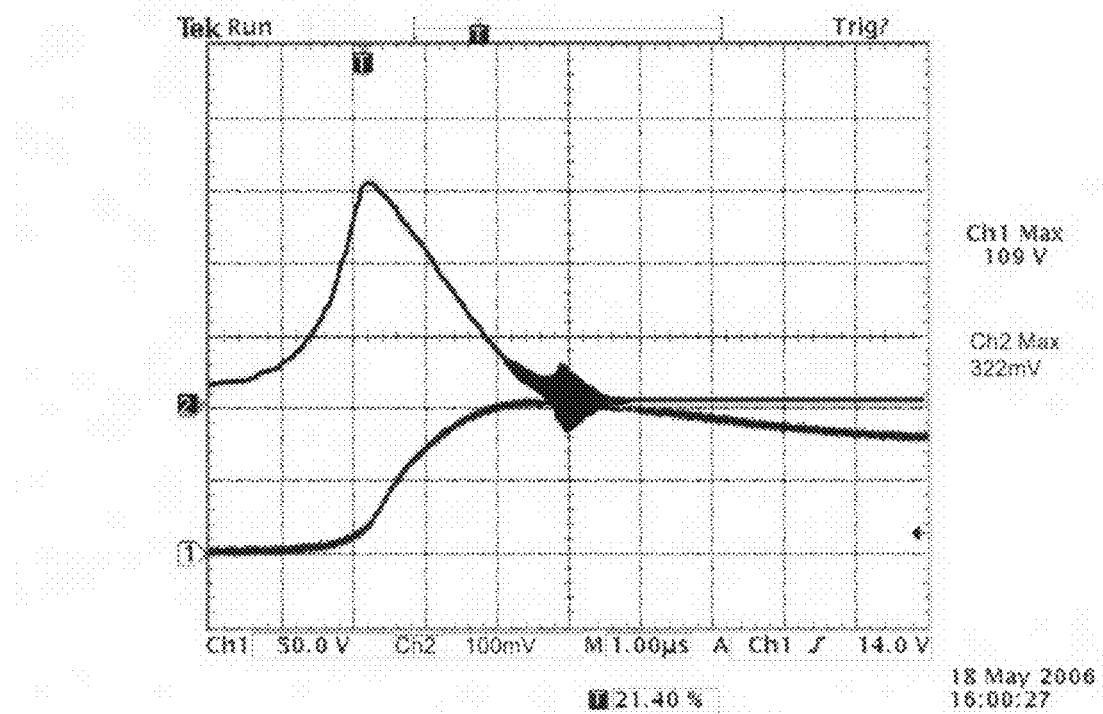
FIGS. 8-10 show impulse testing plots of a prototype design to verify its impulse behavior according to the present invention.
Figure 9:
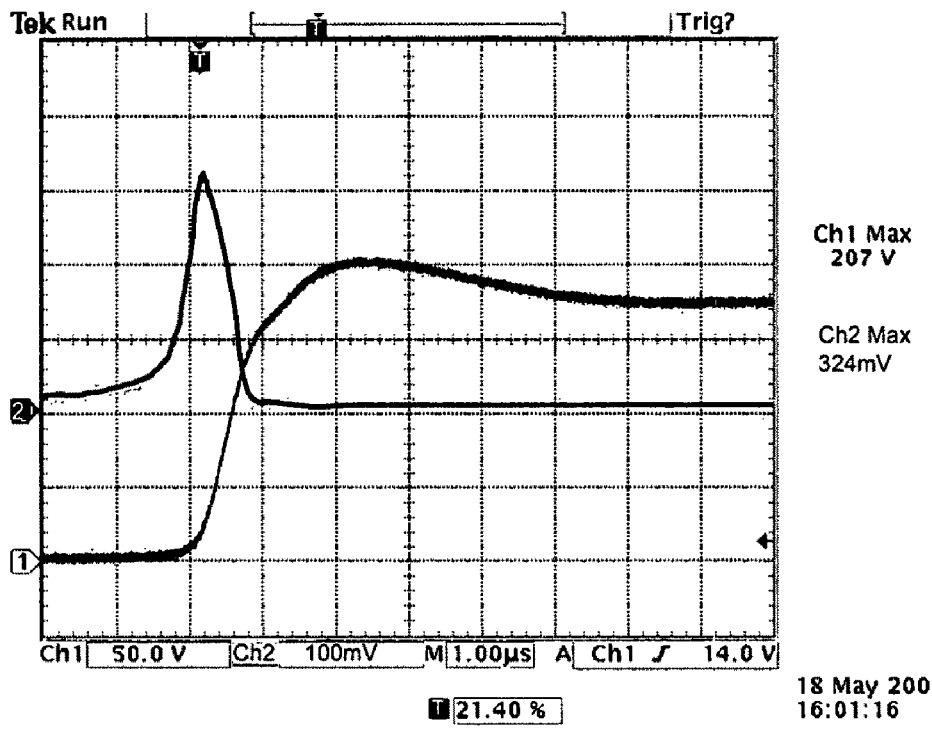
Figure 10:
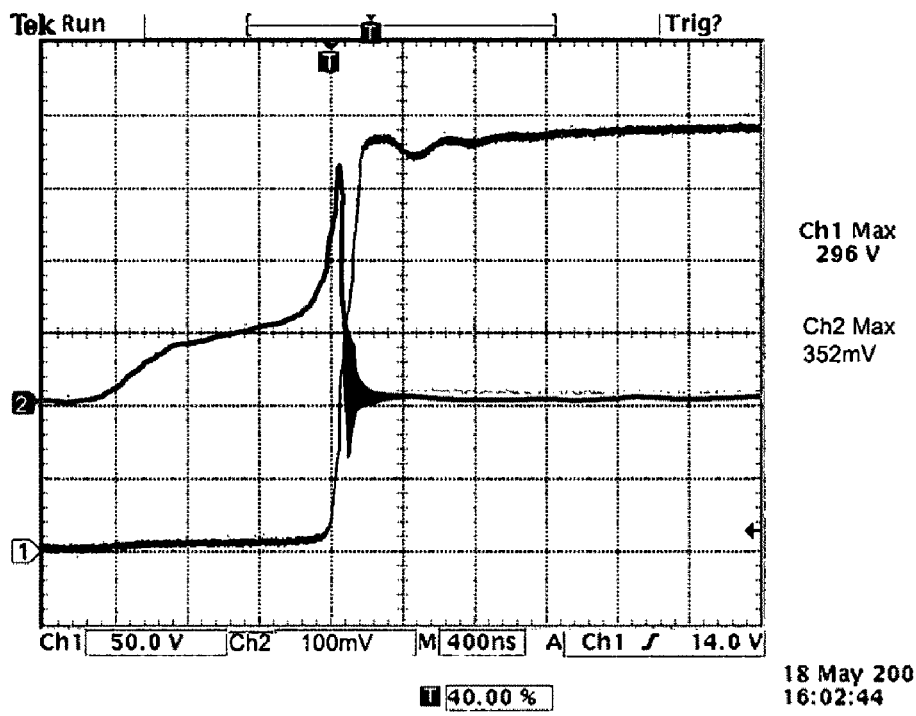

The prototype design was impulse tested to verify its impulse behavior, as shown in FIGS. 8-10, using MOV to clamp the voltage at around 300V max.

FIG. 11 shows the steps for a method of providing a variable trip limit transient blocking unit (adjustable TBU). The steps include monitoring a transient current duration and a transient current amplitude of the transient blocking unit, then decreasing the variable disconnect threshold when the current duration exceeds a predetermined time value or when the current amplitude exceeds a predetermined current value, whereby the duration limit is defined by a capacitor value, and finally triggering the disconnect of the transient blocking unit.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example, the present device uses a combination of NMOS and PJRET types: it is possible to create similar functioning devices with a PMOS and a NJFET.

All such variations are considered to be within the scope and spirit of the present invention as defined by the following claims and their legal equivalents.

What is claimed:
1. A variable trip limit transient blocking unit circuit comprising:
  a. transient blocking unit (TBU); and
  b. a low-pass filter, wherein said filter is an RC circuit having an RC time constant, wherein said RC circuit is disposed to approximate an integrator operating over periods of time that are short compared to said RC time constant, wherein said RC circuit integrates a signal representing an approximated current flowing through said transient blocking unit and triggers a disconnect threshold in said transient blocking unit when a voltage stored across a capacitor of said RC circuit reaches a predefined limit, wherein said TBU comprises a disconnect threshold that varies over time and current.

2. The variable trip limit transient blocking unit circuit of claim 1, wherein said transient blocking unit comprises a PJFET connected to a depletion mode NMOS, whereby said connection provides a transient blocking unit having high disconnect threshold.

3. The variable trip limit transient blocking unit circuit of claim 2, wherein said capacitor of said low-pass filter is disposed to receive a charge when a voltage is provided across said transient blocking unit.

4. The variable trip limit transient blocking unit circuit of claim 3, wherein said capacitor of said low-pass filter is disposed to provide a gate-source voltage to said PJFET, whereby creating a sharp threshold point in said PJFET, whereas a rapid increase in a drain-source resistance of said transient blocking unit is created.

5. The variable trip limit transient blocking unit circuit of claim 4, wherein said drain-source of said transient blocking unit is disposed to provide feedback to said capacitor, whereby said rapid increase in said drain-source resistance provides a high voltage drop across said transient blocking unit, whereas said feedback increases said voltage across said capacitor to trigger said disconnect threshold of said transient blocking unit.

6. The variable trip limit transient blocking unit circuit of claim 1, wherein said low-pass filter is a switched capacitor filter or a digitally-based integration function block.

7. A variable trip limit transient blocking unit circuit comprising:
   a. a current monitoring circuit, wherein said current monitoring circuit monitors a transient current duration and a transient current amplitude of said transient blocking unit; and
   b. a variable trip threshold, wherein said variable trip threshold decreases when said current duration exceeds a predetermined time value or decreases when said current amplitude exceeds a predetermined current value, whereby said duration limit is defined by a capacitor value.

8. The variable trip limit transient blocking unit circuit of claim 7, wherein said variable trip threshold is dependent on a parameter selected from a group consisting of current, voltage, temperature and time.

9. The variable trip limit transient blocking unit circuit of claim 7, wherein said capacitor is an external capacitor.

10. A method of providing a variable trip limit transient blocking unit comprising:
   a. monitoring a transient current duration and a transient current amplitude of said transient blocking unit;
   b. decreasing said variable disconnect threshold when said current duration exceeds a predetermined time value or when said current amplitude exceeds a predetermined current value, whereby said duration limit is defined by a capacitor value; and
   c. triggering said disconnect of said transient blocking unit.

* * * * *